Inventor
Ferris T. Harrington
Walter R. Breeler

Patented May 16, 1933

1,908,887

UNITED STATES PATENT OFFICE

WALTER R. BREELER AND FERRIS T. HARRINGTON, OF DETROIT, MICHIGAN, ASSIGNORS TO WHITMAN & BARNES, INC., OF DETROIT, MICHIGAN, A CORPORATION OF MICHIGAN

METHOD OF MAKING COMPOSITE REAMERS

Application filed April 5, 1930. Serial No. 441,870.

This invention relates to composite cutting tools, such as reamers, having a hard cutting edge or edges of special steel or alloy particularly adapted to retain a sharp edge and suitably attached to a shank or stock of another less expensive material.

The invention aims to provide an improved cutting tool with a surface hardened steel body portion or shank, and a special type of cutting edge (or edges) secured so firmly thereto as to form a substantially integral blade.

One object is to provide a composite tool that may be accurately machined to size and the blades sharpened before it is completed, and that may be subsequently hardened on the surface without warping or injuring the parts.

A further object is to provide a tool having a body portion made of a relatively cheap steel and formed with grooves or dovetail recesses for mechanically holding a special cutting edge material, the body being made of such material that it may be surface hardened by a low temperature process, such as nitrogen-hardening, after the cutting edge material is securely fastened in the grooves or recesses.

A further object is to provide a method of making composite tools by which the body portion, or shank, may be surface hardened after a hard cutting edge is secured thereto by brazing, welding, or mechanically fitting, the surface hardening of the body or shank being effected at a temperature which is below the softening or melting point of the brazing material used, and below the temperature at which distortion of the tool might occur.

The hard surface of the shank or holder portion of tools of our invention is of advantage in resisting wear, facilitating removal of chips by preventing their packing in the grooves, preventing scoring or eroding of any portion of the shank or holder, and in general acting as a continuation of the hard cutting edges mounted thereon. Preferably the shank is of such material that when surface hardened it can function as a cutting edge. This surface hardness is of a particular advantage on reamer pilots and flutes, drill flutes, and surfaces of lathe tools and cutters.

Other objects and advantages of the invention will be apparent to those skilled in the art.

In the accompanying drawing.

Figure 1:
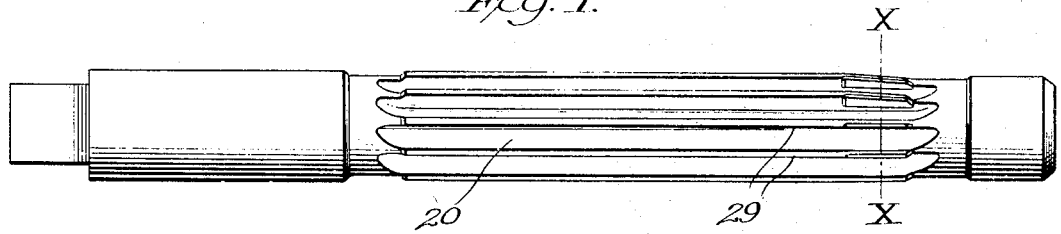
Fig. 1 is a side view of a pilot reamer with special hard cutting edges secured thereto adapted to withstand the wear where the cutting action is most severe.
Figure 2:
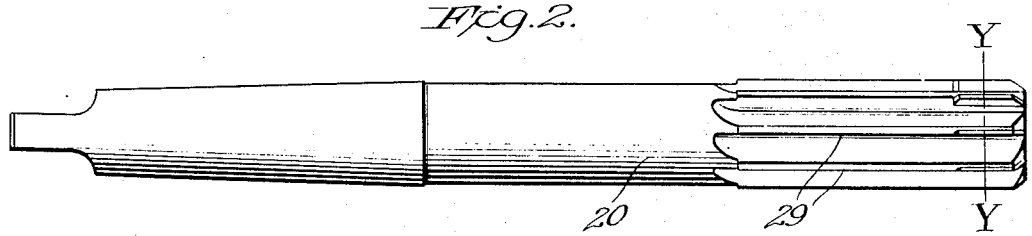
Fig. 2 is a side view of another type of reamer, likewise provided with special cutting edges where the wear is the most severe.
Figure 3:
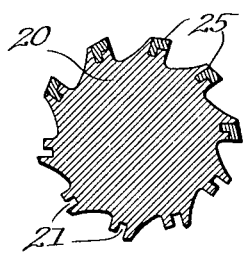
Figure 4:
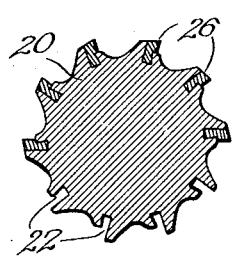
Figure 5:
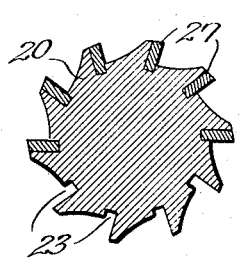
Figure 6:
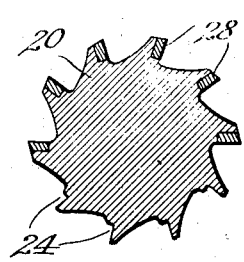

Figs. 3, 4, 5, and 6 are cross sections, on an enlarged scale, one the line x—x of Fig. 1, or y—y of Fig. 2, looking toward the right, the lower half being shown before and the upper half after the cutting edges have been attached, Fig. 4 showing "anchor grooves" in which special cutting edges are to be secured mechanically.

Tools of the general type to which the invention pertains may be called "composite tools", and broadly, are made of a relatively cheap steel which is pre-shaped and which may be sharpened, and to which a cutting edge (or edges) is secured; and this invention contemplates the completion of such composite tools by nitrogen-hardening or other hardening treatment at low temperatures (under 1250° F.) preferably by nitriding, the effect of which is to produce a hard surface layer of measurable thickness encompassing the cheap steel portion of the tool.

In the several embodiments illustrated in the drawing, the body or shank of the tool is made of a suitable steel in a sorbitic structural condition that may be subsequently hardened by nitrogen-hardening, preferably by "nitriding" or "cyaniding", and is suitably shaped by forging, milling, or otherwise, in the desired form of a particular finished tool. The inserted cutting edges are made of a superior material, very hard and enduring, preferably not affected by a welding or brazing temperature, such as a tungsten carbide product, for example such products as are commercially known as "Widia", "Carboloy", "Firthite", "Straus metal", etc., or a special cutting alloy, for example an alloy commercially known as "Haystellite", or any of the known types of "high speed steels", including cobalt high speed steels, may be used.

In the reamers illustrated in Figs. 1 to 6 inclusive, the reamer body 20 may be made of relatively cheap steel. Suitable recesses, or seats 21, 22, 23, 24, (see Figs. 3, 4, 5 and 6) are accurately cut to size into what would normally be the cutting or reaming faces, the recesses or seats being preferably cut with an end mill; and in said accurately cut recesses or seats, are secured by brazing, welding, or mechanically fitting, accurately shaped segments 25, 26, 27, 28 of superior cutting materials of the character described above.

If the cutting edges are brazed to the body of the tool, the particular brazing material used to secure them is not important, except that it is required that it have a high melting point, preferably not less than 1300° F. The cutting edge material is shaped in advance to approximately the desired shape and size so that the tool will be semi-finished upon the completion of the brazing, or welding, or mechanically fitting of the edge to the shank.

The whole tool is next rough ground to about .005″ oversize and then subjected to the hardening treatment described hereafter. With all of the parts accurately shaped in advance, the inserted cutting edges 25, 26, 27, 28 and edges of the ribs or flutes 29 of the reamer will be in alinement (as shown in Figs. 1 and 2), and if said edges are not in perfect alinement, they may be ground to the desired shape and size before hardening, or they may be finished ground to size after nitriding.

In the form illustrated in Fig. 4, the body of the tool is provided with suitable dovetail or undercut grooves 22 of any desired shape, which are herein called "anchor groves", and in which are mechanically secured the pre-shaped and sharpened cutting edges 26. These cutting edges 26 may be made of any of the hard wear resisting materials above noted, for example "Widia", and having been accurately shaped and sharpened, are firmly secured in the anchor grooves of the body of the tool, after which the tool is subjected to the low temperature surface hardening, for example nitriding, as hereinafter described. After the hardening process is completed, the tool is finish ground and then is ready for use.

In all of the various embodiments of the invention, the steel used for the body or shank of the tool should be of a kind that will be hardened by treatment at a suitable low temperature with nitrogen-containing, or nitrogen-carbon-containing compounds, for example by the "nitriding process", or by "cyaniding". A number of steels which surface harden readily by nitriding or cyaniding, and which may be successfully used commercially for this invention are well known, one of which contains the following:

| C | Si | Al | Cr | Mo |
|---|---|---|---|---|
| 0.36 | 0.27 | 1.23 | 1.49 | 0.18 |

Another suitable steel contains the following:

C up to 0.60, Al 0.50 to 2.00, Cr and equivalent elements 0.50 to 4.00

The above alloy steels may also contain small quantities of manganese, phosphorus, sulphur, etc. A number of alloy steels are known to those skilled in the art which contain suitable alloying elements in proper proportions to be successfully used in this process.

After the cutting edge material has been fitted and brazed or welded, or mechanically secured to the body, the tool is subjected to the hardening process, as by nitriding or cyaniding, at a temperature below the melting point of the brazing material. Nitride hardening is generally practiced at temperatures between 900° F. and 1250° F.

In order to produce a comparable surface with the ordinary method of making composite tools of this nature it would be necessary to use a high price tool steel for the holder and to water or oil quench or air cool the entire tool to produce a hard surface. If the finished tool is water or oil quenched, an inserted or brazed tip or cutting edge would loosen or crack and the tool would warp. The steels which are capable of air hardening are not suitable for brazing. Our method of nitriding or cyaniding a suitable steel has the advantage of being safe and convenient, and produces a surface of greater hardness than can be obtained by using a tool steel or special steel and hardening by the usual methods.

The reamer may be accurately shaped, sharpened, and otherwise finished, or partially finished, before it is subjected to the surface hardening process; and the step of hardening does not weaken, warp or otherwise injure the tool in any manner.

The surface hardness of the shank or holder is a distinct advantage over soft steel shanks in that chip removal is facilitated due to the smooth hard shank steel surface, and the shank steel cannot be scored or abraded by the chips or bushings. The hardened shank or holder, which is shaped as a continuation of the inserted cutting edges, can itself act as a cutting edge and constitutes another advantage of this tool. These nitrided cutting edges formed of the body material accurately finish the holes to size and complete the work begun by the inserted cutting blades of the hard cutting alloy. As the reamer becomes worn with use, the rearward nitrided cutting edges perform more and more of the cutting as this is made possible by the hardness of such edges. Our composite reamer is therefore possessed of long life although all but the inserted cutting blades is made of relatively cheap alloy steel.

The essential difference between a reamer, for example, made as above outlined and other types of inserted tip or blade or composite steel or alloy reamers lies in the fact that the holder or shank of our invention can be surface hardened conveniently, safely and in a new way, without damaging the cutting tips, braze, weld or mechanical fit. This process also prevents any warpage of the reamer during the hardening of the shank or holder.

I claim:

The process of making composite reamers of the character described comprising forming the body of nitridable easily machinable steel so as to provide chip flutes and cutting edge and pilot portions of body steel, forming suitable notches at the working ends of the cutting edge portions to receive inserted cutting edges of special hard wear resisting material unaffected by brazing temperatures, brazing said inserted cutting edges in said notches with a brazing material having a melting point above 1300° F., and grinding said tool to correct size and alignment, and thereafter nitrogen-hardening said tool at a temperature below 1250° substantially as described, thereby producing an unwarped tool having primary cutting edges of inserted wear resistant steel and secondary cutting edges, pilot surfaces and chip flutes formed of the nitride surface hardened body steel.

In testimony whereof, we have signed our names to this specification.

WALTER R. BREELER.
FERRIS T. HARRINGTON.